United States Patent
Pouyfaucon et al.

(10) Patent No.: US 6,740,173 B1
(45) Date of Patent: May 25, 2004

(54) METHOD FOR PROTECTING METALS AGAINST CORROSION AND NON-POLLUTING REACTIVE COMPOSITION THEREFOR

(75) Inventors: Jacques Pierre Pouyfaucon, Landes (FR); Bernard Jean Leon Boutevin, Herault (FR); Yves Hervaud, Herault (FR)

(73) Assignee: Atofina, Hauts de Seine (FR)

( * ) Notice: Subject to any disclaimer, the term of this patent is extended or adjusted under 35 U.S.C. 154(b) by 106 days.

(21) Appl. No.: 10/018,175

(22) PCT Filed: Jun. 13, 2000

(86) PCT No.: PCT/FR00/01636

§ 371 (c)(1),
(2), (4) Date: Feb. 14, 2002

(87) PCT Pub. No.: WO00/77101

PCT Pub. Date: Dec. 21, 2000

(30) Foreign Application Priority Data

Jun. 11, 1999 (FR) .............................. 99 07440

(51) Int. Cl.⁷ ............................... C23C 22/00
(52) U.S. Cl. ................... 148/250; 148/259; 106/14.12; 252/389.2
(58) Field of Search ................. 148/250, 259; 106/14.12; 252/389.2

(56) References Cited

U.S. PATENT DOCUMENTS 4,505,748 A * 3/1985 Baxter ................ 106/14.39
5,980,619 A * 11/1999 Braig et al. ........... 106/14.12

FOREIGN PATENT DOCUMENTS

EP    0763574 A2 * 3/1997 ............ C09D/5/08

OTHER PUBLICATIONS

ASM International, ASM Handbook, vol. 13, "Cleaning for Surface Conversion", pp. 1–4, 1992.*

* cited by examiner

*Primary Examiner*—Andrew L. Oltmans
(74) *Attorney, Agent, or Firm*—Notaro & Michalos P.C.

(57) ABSTRACT

The invention concerns a method for protecting metal products against corrosion, characterised in that it consists in applying directly on the metal products, that is without prior treatment, a composition consisting at least of a film-forming binder, at least a corrosion inhibiting additive reactive with metal and at least an oligomer additive bearing phosphonic acids. The inventive composition is characterised in that it comprises a film-forming binder, at least a corrosion inhibiting additive reactive with metal and at least an oligomer additive bearing phosphonic acids.

12 Claims, No Drawings

METHOD FOR PROTECTING METALS AGAINST CORROSION AND NON-POLLUTING REACTIVE COMPOSITION THEREFOR

The present invention concerns novel macromolecular compounds, their synthesis and their use in mixture with a binder, particularly for paints usable for protecting metal surfaces against corrosion.

Polymers or copolymers bearing phosphonate groups or fluorine groups are already known. Substances of this kind, described more particularly in BE Pat. 09400881, are obtained from a halogenated polymer and/or copolymer activated by at least one peroxide and/or hydroperoxide function, to which at least one phosphonate chain is attached by means of an unsaturated monomer.

The substances described in said patent do protect metal surfaces, but they have many disadvantages.

A first disadvantage of the substances described in the prior art is they must be synthesized from a base material such as a halogenated polymer and/or copolymer of the type of poly(vinylidene fluoride) (PVDF), which is available commercially. Commercial chemicals, however, are highly elaborated and therefore very expensive, thus increasing the cost of the end product.

Another disadvantage is that the polymer and/or copolymer is thermoplastic and therefore sensitive to heat.

A third disadvantage is that activation techniques employing electron beams or ozone are onerous processes.

Yet another disadvantage is that with the materials described in the above-cited document, it is impossible to modulate the protection period of the metal.

In industry, protection for metal parts is desired as a temporary measure, prior to use, or for longer periods of time, depending on the subsequent use of the parts. For instance, it is desirable to be able to store protected parts for periods that can vary by a few months and then be able to use them.

Also known are polymers or copolymers bearing phosphonate groups, film-forming groups and crosslinkable groups.

The state of the art with regard to the synthesis of phosphorus-containing copolymers can be summarized as follows:

phosphate monomers, which are acrylates of the following formula

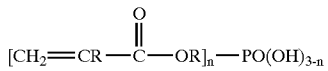

described in the patents

U.S. Pat. No. 5,378,291 (Nihon Parkerizing Co.),
PCT WO 88/02 382 (DuPont de Nemours),
EPA 0 221 498 (Johnson et Son),
EPA 0 376 591 (Rohm and Haas),
EPA 0 458 245 A1 (Nippon Paint Co.).

The disadvantages of these materials are, first, their instability with regard to hydrolysis (C—O—P bond) and the fact that their double-bond reactivity functionality is higher than 1, which naturally excludes them from the domain of solvated paints.

phosphonated monomers, which are of several types:

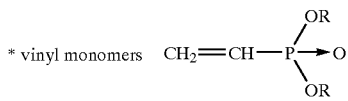

which are described in the patents:
DP 2 232 711 (Stauffer Chem.)
EPA 0 069 31.8 (Hoechst)

Their principal disadvantage, apart from price, is their very poor polymerization reactivity.

styrene monomers:

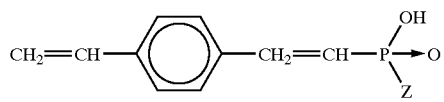

which are described in U.S. Pat. No. 3,051,740 (Monsanto).

The disadvantage of these materials is their intricate and costly synthesis.

acrylate monomers

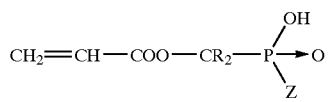

Z = R, OR described in the patents:
EPA 0 278 029 (Dow Chemical)
U.S. Pat. No. 4,658,003 (Dow Chemical), which may result in chemically unstable end products. In addition, the use and disposal of aldehydes, especially formol, which is a necessity for synthesis, are deprecated for environmental reasons.

fluorophosphonates

described in the patent EPA 0 398 250 (Daikin).

Their disadvantages are poor radical-polymerization reactivity and very complex preliminary synthesis.

Ordinary paints are composed of a film-forming agent, which forms a film of one or more solvents, pigments and/or colorants on the metal and which hardens at ambient temperature or above. These paints are applied to the metal directly when it is free of oxidation, impurities and/or dirt or after it has undergone an anticorrosion treatment, for example phosphating followed by chromating. The chemicals used for such anticorrosion treatment contain toxic heavy-metal derivatives and highly volatile solvents. Such treatments are therefore harmful both to human health and to the environment.

The following patents can also be cited as belonging to the prior art:

EP 0 516 346, which describes a method for synthesizing certain telomers in an aqueous medium and provides for phosphorus-containing additives.

EP 0 277 711, which cites a few substituent phosphonic groups of polyesters somewhat randomly, without any specific intentions; moreover, it is primarily amines rather than phosphonates that are being sought.

EP 0 035 316, which alludes to mineral zinc phosphate additives rather than organic phosphonates.

The present invention concerns a treatment method and a composition that has the property of ensuring anticorrosion protection and adherence to metal but eliminates the need for prior treatment, particularly the anticorrosion treatments of phosphating and chromating.

To this end, the invention concerns a method for protecting metal articles against corrosion, characterized in that it consists in applying to the metal articles directly, i.e., without prior treatment of any kind, a composition formed, at the least, of a film-forming binder, at least one corrosion-inhibiting additive reactive with metal, and at least one oligomer additive bearing phosphonic acids.

According to other characteristics of this method:
metal articles to be treated whose surfaces are excessively oxidized but not scaled are subjected to coarse brushing to reduce their surface oxidation to a low value that is not necessarily zero, and the composition is then applied to them;
metal articles to be treated whose surfaces are excessively greasy are subjected to coarse cleaning to reduce their surface grease to a low value that is not necessarily zero, and the composition is then applied to them.

The invention also concerns a composition for protecting metal articles against corrosion, comprising a binder and at least one additive, characterized in that it comprises a film-forming binder, at least one corrosion-inhibiting additive reactive with metal, and at least one oligomer additive bearing phosphonic acids.

According to other characteristics of this composition:
it further comprises one or more pigment additives;
it further comprises one or more wetting agents;
the wetting agent includes at least one component selected from the following:
ethoxylated alkyl and aryl phosphonates,
fluorocarbon derivatives,
perfluoroalkylated ammonium sulfonate,
perfluoroalkylated potassium sulfonate,
perfluoroalkylated alcohol amino sulfonate
perfluoroalkylated acrylate
the additives bear a polymer chain compatible with the binder;
the additives are statistical copolymers having blocks or grafts that bear sequences or grafted components compatible with the binder;
the additives are copolymers of at least one monomer compatible with the binder and of at least one phosphonated monomer;
the monomer compatible with the binder is chain-polymerizable and is selected from methacrylic acrylic, styrene, vinyl chloride, vinyl fluoride and vinyl ester monomers;
the monomer compatible with the binder is selected from polycondensable monomers, diols and epoxide diacids;
it includes phosphonic acid groups;
the reactivity additive is a phosphonate or a phosphate whose molecular chains are either hydrocarbonated, fluorinated or chlorofluorinated;
the reactivity additive includes at least one component selected from:
alkyl acid phosphones and phosphonates,
phosphoric acids,
aminotrimethylene phosphonic acid,
1-hydroxyethylidene-1-1-diphosphonic acid,
ethylene diamine tetramethylene phosphonic acid,
hexamethylene diamine tetramethylene phosphonic acid,
diethylene triamine pentamethylene phosphonic acid.

The invention will be better understood from the following detailed description, provided solely as an indicative and nonrestrictive example. The following substances may be cited among those used in the formulations of the inventive composition:

A) Film-forming Binders

These are homopolymers and copolymers obtained from unsaturated monomers used in paints. Said monomers are vinyl, acrylic, styrene, dienic, halogenated or nonhalogenated monomers well known to those skilled in the art.

In the case of reactive binders, the reactivity is most often supplied by carboxylic acid groups, but it can also be supplied by phosphonate groups, which makes the binders more compatible with the additives of the invention.

The phosphonic groups are supplied by monomers that will be described below in connection with the reactive additives.

B) Reactive Additives

These are molecular or macromolecular compounds of low molar mass (less than a few thousand, and preferably close to one thousand).

In addition, these additives all bear phosphorus-containing groups (preferably phosphonic groups), and their primary purpose is to react with metal at its surface. At least one acid function (P—OH) is therefore necessary.

Three major classes of additives can be contemplated:

Phosphonated alkanes or alkenes

These substances have one or more phosphonic groups at their chain ends and/or within the chain.

The following formulas are possible:
Monophosphonic compounds:

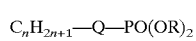

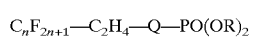

where Q=nil or $SC_xH_{2x}$ and x=2.3

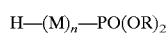

R=H or alkyl in all cases.

diphosphonic and telechelic compounds

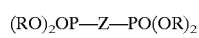

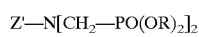

where: R=H, alkyl

Z' similar to the groups previously described with regard to monophosphonic compounds, Z=alkylenes or arylenes derived from nonconjugated dienes (divinylbenzene or 1-5-hexadiene, for example)

polyphosphonic compounds:

Structures may contain plural phosphonic groups ($\geq 2$). For example, with PBHT as the starting material, the following formula is obtained:

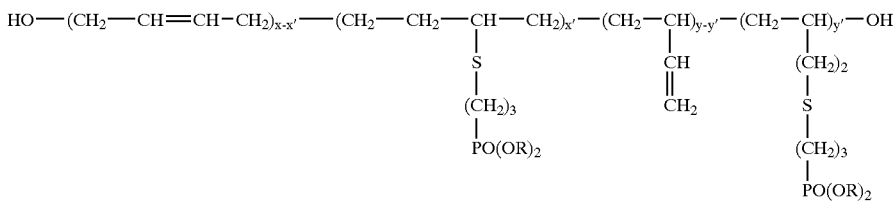

where R=H or alkyl

References:

Polymer Bulletin 41, 145–151 (1998),
Grafting phosphonated thiol on hydroxy telechelic polybutadiene (Bernard Boutevin, Yves Hervaud, Gérard Moutedous) [citation sic].

All-phosphonic statistical telomers and cotelomers
The structures are as follows, respectively:

R—$M_1)_n$—X where $n \geq 2$ and

R—$(M_1)_x$—$(M_2)_y$—X where $n \geq 2$ (statistical)

The phosphonic groups are supplied either by vinyl, allyl, acrylic or styrene monomers or by telogenic agents (R—X) of the phosphonate type (alkyl or haloalkyl).

The $M_2$ comonomers are all those generally used in copolymerization, which are well known to those skilled in the art; some examples are:

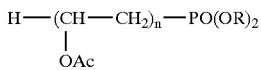

where R=H, alkyl from vinyl acetate

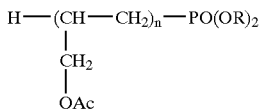

where R=H, alkyl from allyl acetate

Starting with methyl methacrylate (MMA) and phosphonated methyl methacrylate (MAPHOS), radical seeding results, after hydrolysis, in statistical copolymers of the following formula:

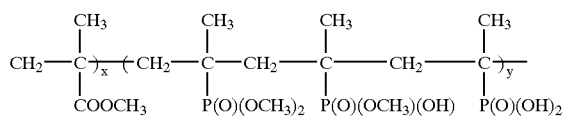

Block phosphonic cotelomers.

Recent advances in controlled radical polymerization have provided access to block copolymers (see "Synthesis of Block Copolymers by Radical Polymerization and Telomerization," *Advances in Polymer Science*, Vol. 127, pp. 88–112, B. Améduri, B. Boutevin and Ph. Gramain, Ecole Nationale Supérieure de Chimie de Montpellier, URA 1193 CNRS 8, rue Ecole Normale, 34053 Montpellier Cedex France).

In the case of methacrylic derivatives, two methods have been used:

atom-transfer radical polymerization (ATRP).

Example with MMA and MAPHOS:

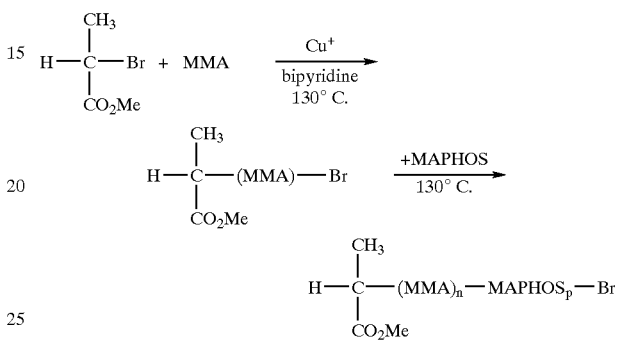

from thiuranes, cotelomers similar to the foregoing are obtained as follows:

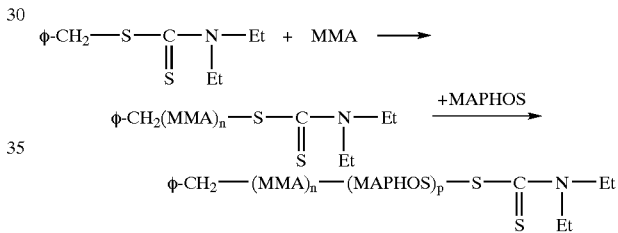

(Living radical polymerization of MMA in the presence of piperidinodithiocarbamate derivatives as photoiniferters (cf. Denis Bertin, Bernard Boutevin, Philippe Gramain, Jean-Marc Fabre and Claude Montginoul
Laboratoire de Chimie Appliquée, UPRES A 50760, Ecole Nationale Supérieure de Chimie de Montpellier—Laboratoire de Chimie Structurale Organique, UPRES A 50760, Université Montpellier II, Eup. Polym. J. Vol. 34, No. 1, pp. 85–90, 1998, Elsevier Science Ltd.) [citation sic]

C) Anticorrosion Additives
modified zinc, calcium or strontium orthophosphate,
modified zinc or aluminum orthophosphate,
modified organic zinc orthophosphate,
modified zinc or molybdenum orthophosphate,
phosphate, zinc silicate, modified hydrated aluminum,
modified zinc, calcium, aluminum or strontium polyphosphate,
etc.

D) Other Additives
Mineral Pigments:
Aluminum, mica, glass flakes, talc, titanium oxide, iron oxides, barium sulfate, chrome green, graphite, silicas, silicates, etc.

Organic Pigments:
Quinacridones, pyrazolone, isonidoline, quinophthalone, phthalocyanine, indatone, etc.

Surfactants:

ethoxylated alkyl and aryl phosphates, fluorocarbon derivatives, perfluoroalkyl ammonium sulfonate, perfluoroalkyl potassium sulfonate, perfluoroalkyl aminoalcohol sulfonate, perfluoroalkyl acrylate.

The invention will be better understood from the following detailed description, provided solely as an indicative and nonrestrictive example.

The invention simplifies the use of paints and coatings and utilizes synergies among the properties of the binders and additives used. In particular, if the binder has good barrier properties and the additive has very good adherence to metal, the resulting materials have excellent corrosion-resistance properties.

Since interpolymer compatibility is a relatively rare characteristic, the polymers that are combined are of the same kind or are very similar, i.e., differing with respect to molecular size or composition, which in most cases is related to the composition of the binder, although they can have some new units.

Phosphonated monomers bear a polymerizable double bond and a phosphonic group, joined to the side chain of the monomer by a C—P bond. Similarly, polycondensable monomers have a phosphonate group connected to the side chain of the monomer by a C—P bond.

Examples include styrene monomers of the formula:

$$CH_2=CH-\text{C}_6\text{H}_4-CH_2-P(=O)(OR)(OR')$$

in which R and R' are similar or different and equal.

Other examples that can be cited are acrylic monomers of the formula:

$$CH_2=CR''-C(=O)-O-Q-P(=O)(OR)(OR')$$

in which R and R' are similar or different.

Q=

$CH_2-CH_2$ $(CH_2)_2-S-(CH_2)_3$ $CH_2-CH(OH)-CH_2-O-C(=O)-CH_2-S-(CH_2)_3$ $CH_2-C(CH_3)(OH)$ $CH_2-CH(OH)-CH_2$

Reaction additives can also be obtained by the chemical modification of commercial oligomers such as PBHT, from Atochem, $$HO-[(CH_2-CH=CH-CH_2)_x-(CH_2-CH)_y-(CH_2-CH_2)_z]-OH$$

with side groups $-CH=CH_2$ and $-CH_2-CH_2-Z-PO(OEt)_2$ where Z=nil or S—CH$_2$—CH$_2$.

All the phosphonated additives described above are effective only in acid form.

The chemical transformation of phosphonic esters, whether on monomers or on copolymers, is well known to those skilled in the art and can be performed, in an acidic or basic medium, to obtain phosphonic monoacids, or, using halosilanes, to prepare phosphonic diacids according to the following reaction:

$$R-P(=O)(OEt)_2 \xrightarrow{\text{BrSiMe}_3 / \text{ISiMe}_3} R-P(=O)(OH)_2$$

The following description, provided in regard to nonrestrictively annexed examples, will furnish a better understanding of how the invention can be put to use.

EXAMPLE 1

Synthesis of a 55/45 MMA/MAPHOS Copolymer

Let MMA represent methyl methacrylate $$CH_2=C(CH_3)-CO_2CH_3$$

and MAPHOS phosphonated methacrylate $$CH_2=C(CH_3)-CO_2(CH_2)-PO(OCH_3)_2$$

prepared according to the method described by C. Brondino (Thesis, Montpellier, 1996).

A one-liter three-necked flask provided with a water-based coolant, nitrogen bubbling and a dropping funnel was charged with 20.0 g (0.2 mol) of MMA, 44.4 g (0.2 mol) of MAPHOS and 400 ml of THF. The dropping funnel was charged with 1.968 g of AIBN [2,2'-azobisisobutyronitrile] dissolved in 100 ml of THF.

The reaction mixture was degassed for 15 min and heated to 70° C. 30 ml of seeding solution were then added dropwise. Two hours later, another 30 ml of seeding solution were added dropwise. The rest of the seeding solution was then added dropwise after 4 h.

After 6 h of reaction, the reaction mixture was precipitated in 4 l of pentane. The copolymer thus collected was filtered and was then dissolved in 200 ml of dichloromethane. The mixture was again precipitated in 4 l of pentane, and after filtration a fine, white, dusty, very hygroscopic powder was obtained. This was dried in a balloon flask under high vacuum for 4 h. 59.8 g of copolymer was obtained, for a yield of 93%.

$^1$H NMR analysis (CDCl$_3$) confirmed the composition of the copolymer, which contained 54% MMA and 46% MAPHOS.

EXAMPLE 2

Hydrolysis of a 55/45 MMA/MAPHOS Copolymer

A one-liter three-necked flask provided with a water-based coolant, nitrogen bubbling and a dropping funnel was charged with 59.8 g (0.37 mol) of the copolymer from Example 1, dissolved in 500 ml of dichloromethane. The solution was degassed for 15 min; this was followed by the dropwise addition of 53 ml (0.41 mol) of bromotrimethylsilane freshly distilled under nitrogen. The mixture was stirred at ambient temperature for 3 h.

At the end of the reaction, the solvent was evaporated with a Rotavapor, and an excess of methanol (500 ml) was then added. The mixture was stirred at ambient temperature for 3 h and the solvent was evaporated again. The end product collected was 58.8 g of hydrolyzed copolymer in the form of a yellowish paste.

EXAMPLE 3

Synthesis of an MMA/phosphonated Styrene Copolymer

Let MMA stand for methyl methacrylate, the formula for phosphonated styrene being:

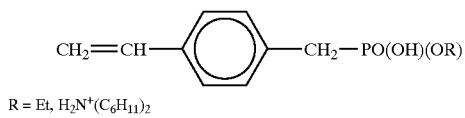

R = Et, $H_2N^+(C_6H_{11})_2$

These substances have already been described. See Bernard Boutevin*, Bachar Hamoui, Jean-Pierre Parisi and Bruno Ameduri, "Homopolymerization and copolymerization of salt formed from a new diethyl styrenic phosphonate monomer," Eur. Polym. J. 32/2 (1996), 159–163, Copyright© 1996, Elsevier Science Ltd., printed in Great Britain, All rights reserved, 0014-3057(95)00132-8-0014-3057/96, $15.00+0.00.

EXAMPLE 4

Grafting of Phosphonated Thiol, HS—$(CH_2)_3$—PO$(OEt)_2$, on a Styrene-butadiene Copolymer A 3-liter flask was charged with 10 g of Finapren 502, 2.76 g of phosphonated thiol and 0.1 g of benzophenone, the whole dissolved in 700 ml of THF. The solution was degassed with nitrogen for 15 min and the reaction mixture was irradiated with UV for 24 h.

The solution was found to have formed a gel, which was redissolved in a total volume of THF of 2.5 l. At the end of the reaction, the solution was concentrated to 700 ml and precipitated in 4 l of methanol. The white precipitate collected was filtered, rinsed and dried under vacuum. This resulted in isolation of the grafted polymer in the form of an elastic gum.

$^1$H NMR analysis (CDCl$_3$) confirmed the structure of the expected material.

Elementary analysis was used to determine the percentage of phosphorus in the grafted copolymer. The value in this case was 2%. The grafting efficiency was therefore 50%.

EXAMPLE 5

Synthesis of a Copolymer Containing an Epoxide Group

A 3.54-liter autoclave equipped with a stirrer was charged with 2l of acetonitrile, 1 mol 2-hydroxcyethyl vinylether, 4 mol 2-(dimethoxyphosphonate) ethylvinylether and 22 g of benzoyl peroxide. The mixture was degassed under vacuum and 5 mol chlorotrifluoroethylene were added. The mixture was heated to 95° C., causing the pressure to increase to 30 bars. The pressure had fallen to 10 bars at the end of 6 h. The reactor was cooled and was degassed to remove the unreacted chlorotrifluoroethylene. A copolymer solution was obtained that yielded nearly 38% dry extract. This copolymer contained fluorine motifs supplying 19 to 21% fluorine (elementary analysis).

EXAMPLE 6

Synthesis of the Copolymer From Example 5 With Silyl Groups

A 3-liter reactor was charged with 160 g of the copolymer obtained according to Example 5, in acetonitrile, and containing 0.5 mole-equivalent of OP(OCH$_3$)$_2$. One mole of bromotrimethylsilane was added at ambient temperature during 2 h. After reaction and evaporation of the solvent, proton nuclear magnetic resonance ($^1$H-NMR) revealed O—Si(CH$_3$)$_3$ groups on the copolymer, substituted for the OCH$_3$ groups.

This polymer can be stored as is, or it can be hydrolyzed with excess methanol. The latter method yields a copolymer containing acid phosphonate structural units: —PO(OH)$_2$.

EXAMPLE 7

The reactor was charged with 160 g of the copolymer from Example 5 and one mole of chlorotrimethylsilane was added in place of the bromotrimethylsilane. The majority component obtained was the phosphonate derivative bearing a methyl-ester function and a sylil function. After hydrolysis, the resulting copolymer contained mixed phosphonate acid-ester structural units of the formula: —PO(OCH$_3$)(OH).

EXAMPLE 8

Synthesis of the Ammonium Salt of the Copolymer From Example 6

The reactor was charged with 140 g of the copolymer obtained according to Example 2, containing approximately 0.5 mole-equivalent of —PO(OH)$_2$; to this was added one mole of cyclohexylamine, i.e., 181 g, and the mixture was

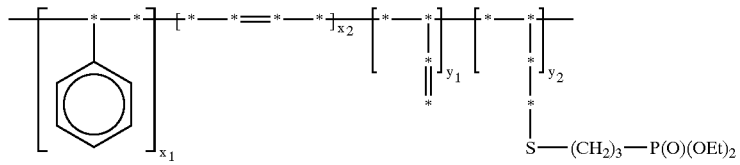

left to react for one hour. Infrared analysis of the product demonstrated disappearance of the OH bands.

EXAMPLE 9

The reactor was charged with the same constituents as in Example 5, but one mole of chlorotrifluoroethylene was replaced with one mole of $CH_2=CH-(CH_2)_2-C_8F_{17}$.

The reaction was then carried out under the same conditions as in Example 5. The end product had a fluorine concentration, determined by elementary analysis, of about 31%. This copolymer can be treated by the same method as that of Examples 6 to 8.

EXAMPLE 10

The compounds were synthesized according to Examples 5 to 8, but the hydroxyethyl vinyl ether was replaced with dimethoxy-methylsilylpropyl vinyl ether of the formula $CH_2=CH-O-(CH_2)_3-Si(CH_3)(OCH_3)_2$.

EXAMPLE 11

A reactor was charged with approximately 180 g of the copolymer according to Example 10 and containing 0.5 mole-equivalent of $-PO(OCH_3)_2$. One mole chlorotrimethylsilane was added and the mixture was left to react for two hours at ambient temperature. As in Examples 2 and 3, $^1H$ NMR then revealed a signal indicating the presence of $OSi(CH_3)_3$ groups.

EXAMPLE 12

Under the same operating conditions as in Example 5, the reactor was charged with a mixture composed of one mole of allyl alcohol and one mole of allyl diethylphosphonate. After cooling, to this was added a gaseous mixture composed of vinylidene fluoride and chlorotrifluoroethylene in a ratio of 6.5:1.5. Under the same pressure conditions as in Example 5, after 6 h of reaction and degassing, a fluorinated copolymer was obtained whose fluorine concentration, measured by elementary analysis, was about 40%.

EXAMPLE 13

Under the same operating conditions as in Example 5, the reactor was first charged with a mixture composed of 1 mol allyl hydroxyethyl ether and 1 mol diethyl vinylphosphonate. After degassing and cooling, 6 mol vinylidene fluoride and 2 mol hexafluoropropylene, $CF_3-CF=CF_2$, were added. After 5 h of reaction, a copolymer containing approximately 48% fluorine was obtained.

EXAMPLE 14

Under the operating conditions of Example 5, the reactor was first charged with 1 mol diethyl allylphosphonate, 1 mol allyl alcohol and 1 mol vinyl acetate. After cooling and degassing, 6 mol chlorotrifluoroethylene were added. After 6 h of reaction, a copolymer containing approximately 31% fluorine was obtained.

EXAMPLE 15

A Hasstelloy autoclave reactor with a capacity of 1000 ml was charged with:
- 234 g (1.69 mol) of phosphonate, $HPO(OEt)_2$
- 2.5 g ($1.71 \cdot 10^{-2}$ mol) of di-tert-butyl peroxide,
- 200 g (4.93 mol) of acetonitrile and 108 g (1.69 mol) of vinylidene fluoride ($VF_2$).

Five hours of reaction at 140° C. yielded a telomer mixture $H(-CF_2-CH_2)_n-PO(OEt)_2$ with a $DP_n$ of about 3.0 and a $VF_2$ conversion ratio on the order of 90%.

EXAMPLE 16

Under the same conditions described in Example 15, the reaction was carried out with chlorotrifluoroethylene (CTFE). 1.97 g (1.69 mol) of CTFE were added. The telomer mixture obtained, $H-(CFCl-CF_2)_n-PO(OEt)_2$, had a $DP_n$ of about 2, and the CTFE conversion ratio was 78%.

EXAMPLE 17

In accordance with Example 15, the phosphonate was dimethyl hydrogen phosphonate, $HPO(OCH_3)$.[1]

[1]TRANSLATOR'S NOTE. Discrepancy in formulas sic; the subscript "2" is missing in the first occurrence.

EXAMPLE 18

In accordance with Example 16, the phosphonate was dimethyl hydrogen phosphonate, $HPO(OCH_3)_2$.[1]

[1]TRANSLATOR'S NOTE. Discrepancy in formulas sic; the subscript "2" is missing in the first occurrence.

EXAMPLE 19

The substances from Example 15 were hydrolyzed, either by means of methanol after silylation by a halosilane of the type $XSi(CH_3)_2$, where X=Cl, Br, or by the action of hydrochloric acid.

Thus, commencing with 50 g of $HCF_2-CH_2-PO(OEt)_2$ monoadduct and 39.4 g of $BrSi(CH_3)_3$ added dropwise in the presence of $CH_2Cl_2$ (solvent) and after 2 h of agitation, 50 ml of methanol were added to the medium. After distillation, 34.7 g of a monoacidic substance, $H-CF_2-CH_2-PO(OH)(OEt)$, were obtained.

EXAMPLE 20

The substances from Example 16 were hydrolyzed as described in Example 19.

A 100-ml balloon flask provided with a coolant was charged with 4.00 g ($1.57 \cdot 10^{-2}$ mol) of monoadduct dissolved in 20 ml of toluene, to which were added 8 ml of 12N HCl ($9.6 \cdot 10^{-2}$ mol; 6 eq. of HCl to 1 eq. of ester). The solution was maintained at solvent reflux (120° C.) for 12 h.

After cooling of the solution, the toluene was evaporated and the solution was washed twice with 50 ml of distilled water. It was reconcentrated. A white solid weighing 4.44 g was recovered from the aqueous phase after concentration and oven-drying. NMR analyses revealed cleavage of 75% of the "phosphonic ester" groups.

EXAMPLE 21

A 100-ml flask provided with a coolant was charged with 6 g of PBHT R-20, 4 g of thiol $HS-(CH_2)_3-PO(OEt)_2$, 0.18 g of AIBN and 60 g of THF (solvent). After 4 h of reaction at 70° C. and after treatment of the product, NMR analyses revealed a grafting ratio of 19%. The grafted product therefore contained 2.6% phosphorus. These reactions have already been described:

Ref.: Bernard Boutevin, Yves Hervaud and Gérard Molédous, "Grafting phosphonated thiol on hydroxy telechelic polybutadiene," *Polymer Bulletin* 41 (1998), 145–151.

EXAMPLE 22

Synthesis of the MMA/MAPHOS Block Copolymer.

Step 1:

MMA was polymerized with thiuram.

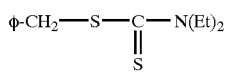

The result was compound (A), of the formula:

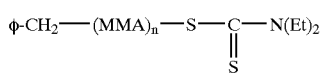

with a number molecular weight of approximately 20,000.

Step 2:

Photochemical polymerization of compound (A) was performed with MAPHOS, yielding copolymer (B) of the formula:

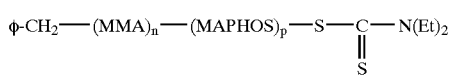

7MAPHOS per chain were added (p therefore equalled 7).

The number molecular weight was approximately 21,000 (structure checked by NMR).

Step 3:

Compound 3 was hydrolyzed by means of $BrSi(Me)_3$, then $CH_3OH$.

EXAMPLE 23

A 1000:1:2 mixture of styrene, dicumyl peroxide and "Tempo" (piperidine nitroxyl) was introduced.

The mixture was maintained at 120° C. for 8 h. An aliquot was analyzed by GPG (gel permeation chromatography), which revealed the formation of a polystyrene with a molecular weight of 45,000, fairly close to the expected value of 50,000.

To the reaction mixture was added $CH_2=CH-\phi-CH_2-PO(OC_2H_5)_2$, in molar proportions of 1 mol polystyrene to 100 mol phosphonated monomer. The mixture was maintained at 120° C. for 10 h, resulting in complete conversion to a phosphonated styrene derivative.

The final polystyrene equivalent molecular weight was 68,000. $^1H$ NMR confirmed the presence of about 5 styrene motifs to 1 phosphonate motif (integration of the $-O-CH_2-CH_3$ group) with respect to all aromatic protons.

The esters were hydrolyzed with $ClSiMe_3$ to obtain the corresponding diacid.

EXAMPLE 24

Synthesis of crosslinkable phosphonates of the following formula

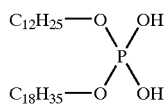

The alcohol $C_{12}H_{25}OH$ was added mole by mole to $POCl_3$ in chloroform in the presence of triethylamine to trap the hydrochloric acid formed. After two hours of reaction, the unsaturated alcohol $C_{18}H_{35}OH$ was added, and after two hours of reflux in $CHCl_3$, the mixture was hydrolyzed. After extraction, a monoacid with an acid index corresponding to the above formula was isolated.

Any of the following three preparations can be used for this example:

Preparation A

From the compound obtained in Example 24, an aqueous solution of the following composition is prepared:

10 parts compound of Example 24

1 part nonyl phenoxyacetic acid a sufficient quantity of ethanolamine to yield $8.5 \leq pH \leq 9.5$ 6 parts propylene glycol monomethyl ether water to make 100 parts.

This solution was applied to steel surfaces, and after removal of the water, protection in accordance with ASTM Standard D 1735-62 was obtained on exposure to a moisture-saturated atmosphere at 37.8° C. The corrosion in accordance with ASTM Standard D 610-68 was estimated at Grade 10 after one week. This was equivalent to a complete absence of corrosion, whereas a steel specimen not treated in this manner exhibited Grade 1 corrosion, corresponding to corrosion of 50% of the surface, after only 24 h.

The compound according to Example 24 provides temporary protection for 168 h, since it is not crosslinked. It can be removed from the steel to make way for subsequent treatment, for example the steel can be rolled, formed, transformed by cutting, stamping, welding, etc.

Preparation B 5 parts compound of Example 24

5 parts 50% styrene-acrylic copolymer 1 part nonyl phenoxyacetic acid dimethylaminoethanol in sufficient quantity to yield $8.5 \leq pH \leq 9.5$ 6 parts propylene glycol monomethyl ether water to make 100 parts This composition resulted in Grade 10 on galvanized steel after six weeks of exposure. Without treatment, an identical surface showed Grade 1 corrosion after one week of exposure.

Preparation C 5 parts compound of Example 13

5 parts 50% styrene-acrylic copolymer 1 part nonyl phenoxyacetic acid cyclohexylamine in sufficient quantity to yield $8.5 \leq pH \leq 9.5$ 2 parts substituted imidazole formiate 6 parts propylene glycol monomethyl ether water to make 100 parts Under the same test conditions as in Example 20, when applied to galvanized steel, this composition resulted in Grade 10 after ten days of exposure.

Using the same composition, the corrosion test was performed by immersion in a 3.5% NaCl solution: without protection, corrosion was evident on a bare steel surface after 15 min. of immersion; after the composition had been applied, no corrosion whatsoever was observed after 12 h of exposure.

This composition is a one that affords temporary protection and can easily be removed by washing.

EXAMPLE 25

Epoxidation of the salt of the acid obtained according to Example 13.

To one mole of acid from Example 1 were added one mole of ammonia followed by 1.2 mol p-chloroperbenzoic acid, and reflux was maintained for one hour. The mixture was concentrated to 50% dry extract.

EXAMPLE 26

To the mixture obtained according to Example 14, acrylic acid was added mole by mole and reflux was maintained for 8 h. After the addition of 1% hydroquinone, an acrylated substance was obtained.

EXAMPLE 27

Diethyl hydrogen phosphonate, $HPO(OEt)_2$, was added to 1-dodecene according to the method described by Peleprat et al. The compound $C_{12}H_{25}PO(OEt)_2$ was obtained in a yield of This compound was hydrolyzed with bromotrimethylsilane according to the method described by Hamoui et al. (Macromol. Chem. Phys., 1985, 1995 [citation sic]). $C_{12}H_{25}PO(OH)_2$ was obtained in this manner.

This diacid was esterified in toluene under heat with a Dean Stark system to remove the water, the esterification being done with an alcohol of the formula $C_{18}H_{35}OH$, to yield a compound of the following formula:

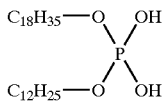

This compound was epoxided as in Example 14, and acrylation was then performed as in Example 25.

EXAMPLE 28

As in Example 16, diethyl hydrogen phosphonate, $HPO(OEt)_2$, was added to one mole of allyl glycidyl ether.

The following compound was obtained quantitatively:

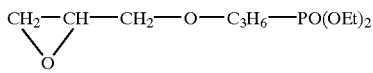

The fatty acid $C_{18}H_{37}CO_2H$ was added to this epoxide in the presence of $10^{-2}$ mol ethyl laurylamine to yield a compound of the following formula:

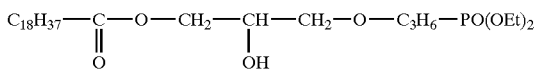

To the preceding compound was added acryloyl chloride, and a compound of the following formula was obtained:

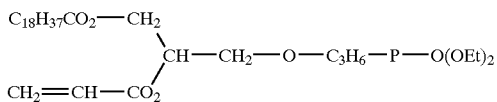

which, when hydrolyzed with bromotrimethylsilane, quantitatively yielded the corresponding acid, of the following formula:

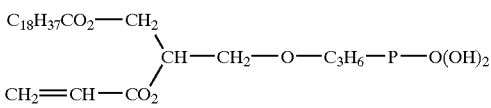

Either of the following two compositions can be used for long-term protection on bare steel:

Preparation A 145 parts compound obtained in Example 28

220 parts polyvinyl difluoride grafted with hydroxyethyl acrylate 6 parts ammonia 167 parts rutile (titanium oxide)

33 parts red iron oxide 2.5 parts dispersant 33 parts diethylene glycol 2.5 parts antifoaming agent 68 parts melamine methylol 323 parts water The characteristics of the composition are as follows:

$8.6 \leq pH \leq 8.8$ ratio of pigment to grafted polyvinyl difluoride=0.55:1.0

Ford No. 4 viscosity 45/50 seconds

% melamine: dry extract: 18.6

The composition is applied by spraying or after dilution. The coating is baked for 10 min at 180° C. or 15 min at 150° C. The resultant coating has a protection period of 500 h (resistance to saline mist measured according to AFNOR Standard×41.002).

The pencil hardness is F.2H.

The NFR 30038 adherence is 100%.

Preparation B 6 parts compound obtained in Example 28

5 parts vinyl-maleic copolymer 4 parts 9% polyvinyl alcohol ammonia in sufficient quantity to yield $8.5 \leq pH \leq 9.0$ 1 part hydroxyethyl cellulose 1 part HLB 12 nonionic wetting agent 8 parts $Zn_3(PO_4)_2, 2H_2O$ water to make 100 parts The density of the composition is 1.08 to 1.10.

The Ford No. 4 viscosity is 20 to 22 seconds.

The composition is sprayed on or applied as is.

Baking is performed for 15 min at 150° C. Long-term protection of steel is obtained, with a protection period of more than 500 h.

EXAMPLE 29

Commencing with the alcohol obtained in Example 17,

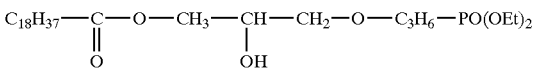

transvinylation was performed with butyl vinyl ether, using a palladium-containing catalyst as described in *J. of Phys. Chem.* 44 (1989), 395, to yield the compound of the following formula:

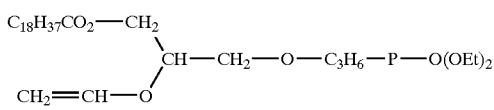

This compound was hydrolyzed with BrSi(Me)$_3$ and ammonia to yield the disalt of the following formula:

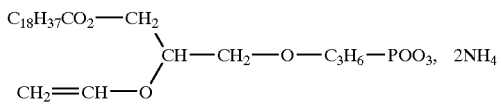

EXAMPLE 30

To the epoxide prepared in Example 14, cinnamic acid was added according to the method of Example 13.

A substance having the following formula was obtained:

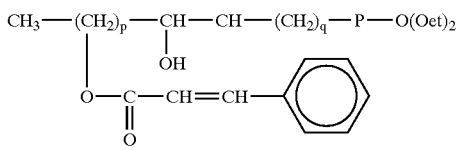

Hydrolysis, performed as hereinabove, yielded a compound of the following formula:

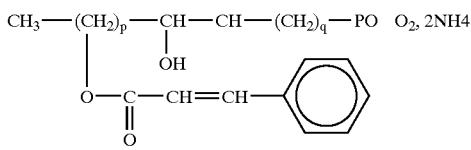

A composition according to the invention can also be in the form of an aqueous emulsion:

EXAMPLE 31

An aqueous emulsion of polyethylene was prepared from the following constituents:

|  | Parts |
| --- | --- |
| PE-AA AC 5120 copolymer | 40 |
| 25% ammonia solution | 8 |
| Dodecylphosphonic acid | 4 |
| Xanthan gum | 1 |
| Demineralized water | 197 |

Synthesis of Dodecylphosphonic Acid

Dodecylphosphonic acid was prepared in two steps as follows:

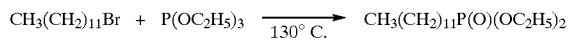

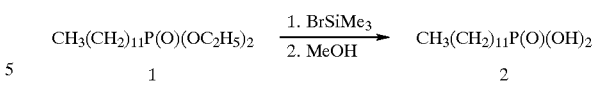

A three-necked flask provided with a dropping funnel, an argon inlet and a distilling apparatus was charged with 49.8 g of bromododecane. The assembly was placed in an inert atmosphere and heated to 130° C. 36.5 g of triethyl phosphite were then added dropwise through the funnel. After 24 h of reaction, the remaining reactants were removed by distillation under vacuum, resulting in the collection of 55.1 g of diethyl dodecylphosphonate 1, i.e., a yield of 90%.

30.6 g of Compound 1 isolated in this manner were then dissolved in 500 ml of dichloromethane. 30.6 g of bromotrimethylsilane (2 eq.) were then added in an inert atmosphere. The mixture was stirred at ambient temperature for 3 h. The solvent was then evaporated, after which 500 ml of methanol were added. After 2 h of stirring at ambient temperature, the methnoal was evaporated. A white solid was collected and was washed in ether and dried under vacuum 23.9 g of dodecylphosphonic acid 2 were collected, for a yield of 95.6%.

Preparation of the Aqueous Emulsion of Polyethylene

A pressurized reactor was charged with Ethylene-Acrylic Acid copolymer AC5120, 25% ammonia solution and demineralized water. All these components were heated to 110° for 15 min with vigorous mechanical agitation. The mixture was cooled rapidly in ice and the emulsion was then collected in the form of a completely homogeneous slurry with a pH of 10.

The aqueous emulsion of polyethylene was placed in a mechanical agitator. Under gentle agitation, xanthan gum was added, followed by dodecylphosphonic acid. The agitation speed was gradually increased to dissolve the additives fully in the emulsion.

What is claimed is:
1. A composition for protecting metal articles against corrosion, comprising:
   a film-forming binder,
   at least one corrosion-inhibiting additive that is reactive with metal; and
   at least one oligomer of
      at least one monomer that is compatible with the binder; and
      at least one phosphonated monomer;
   the monomer that is compatible with the binder being selected from the group consisting of:
      the chain polymerizable monomers selected from the group connecting of: methacrylic acrylic, styrene, vinyl chloride, vinyl fluoride and vinyl ester monomers; and
      polycondensable monomers selected from the group consisting of: diols and epoxide diacids.
2. A composition according to claim 1, in which the oligomer of at least one monomer compatible with the binder, and of at least one phosphonated monomer, includes phosphonic acid groups.
3. A composition according to claim 2, in which the oligomer of at least one monomer compatible with the binder, and of at least one phosphonated monomer is selected from the group consisting of: copolymers of meth- ylmethacrylate and phosphonated methylmethacrylate; copolymers of methylstyrene and phosphonated methylmethacrylate; styrene-butadiene copolymers grafted with a phosphonated thiol; a copolymer of three monomers, of which the first monomer is selected from the group consisting of 2-hydroxyethylvinylether and dimethoxymethylsilylpropyl vinyl ether, the second monomer is selected from the group consisting of 2-(dimethoxyphosphonate)ethylvinylether, 2-(monomethoxyphosphonate)ethylvinylether and 2-(phosphonic acid)ethylvinylether, and the third monomer is selected from the group consisting of chlorotrifluoroethylene and $CH_2=CH-O-(CH_2)_2-C_8F_{17}$; a copolymer of allyl alcohol, allyl diethylphosphonate, vinylidene fluoride and chlorotrifluoroethylene; a copolymer of diethylallylphosphonate, allyl alcohol, vinyl acetate and chlorotrifluoroethylene; a copolymer of diethylphosphonate and vinylidene fluoride; a copolymer of diethylphosphonate and chlorotrifluoroethylene; a copolymer of dimethylphosphonate and vinylidene fluoride; a copolymer of dimethylphosphonate and chlorotrifluoroethylene; a copolymer of monoethylphosphonate and vinylidene fluoride; a copolymer of monoethylphosphonate and chlorotrifiuoroethylene; a copolymer of phosphonic acid and vinylidene fluoride; a copolymer of phosphonic acid and chlorotrifluoroethylene; a copolymer of hydroxytelechelic polybutadiene grafted with $HS-(CH_2)_3-PO(OEt)_2$; a copolymer of styrene and $CH_2=CH-\phi-CH_2-PO(OC_2H_5)_2$; a copolymer of diethylallylphosphonate, allyl alcohol, vinyl acetate and chlorotrifluoroethylene and acrylic acid.

4. A composition according to claim 1, in which the corrosion-inhibiting additive reactive with metal is a phosphonate or a phosphate whose molecular chains are either hydrocarbonated, fluorinated or chlorofluorinated.

5. A composition according to claim 4, in which the corrosion-inhibiting additive reactive with metal comprises at least one component selected from the group consisting of:

alkyl acid phosphones and phosphonates,
phosphoric acids,
aminotrimethylene phosphonic acid,
1-hydroxyethylidene-1-1-diphosphonic acid,
ethylene diamine tetramethylene phosphonic acid,
hexamethylene diamine tetramethylene phosphonic acid, and
diethylene triamine pentamethylene phosphonic acid.

6. A composition according to claim 5, in which the film-forming binder is selected from the group consisting of homopolymers and copolymers obtained from unsaturated monomers.

7. A composition according to claim 6, in which the unsaturated monomers are selected from the group consisting of: vinyl, acrylic, styrene, dienic, halogenated or non-halogenated monomers.

8. A composition according to claim 1, further comprising at least one additive selected from:

pigment additives; and
wetting agents.

9. A method for protecting metal articles against corrosion, comprising at least one step consisting in applying to the metal articles a composition according to claim 1.

10. A method according to claim 9, which does not comprise any anticorrosion treatments of phosphating and chromating prior to applying to the metal articles a composition according to claim 1.

11. A method according to claim 9, which comprises at least one step wherein metal articles are subjected to coarse brushing prior to the application of the composition according to claim 1.

12. A method according to claim 9, which comprises at least one step wherein metal articles are subjected to coarse cleaning prior to the application of the composition according to claim 1.

* * * * *